United States Patent [19]

Franson et al.

[11] Patent Number: 5,127,661

[45] Date of Patent: Jul. 7, 1992

[54] FLUID SEAL

[75] Inventors: David C. Franson, Kalamazoo; Mark A. Kavanaugh, Otsego; Wallace K. Snead, Allegan, all of Mich.

[73] Assignee: Parker Hannifin Corporation, Cleveland, Ohio

[21] Appl. No.: 691,574

[22] Filed: Apr. 25, 1991

[51] Int. Cl.⁵ .............................................. F16J 15/48
[52] U.S. Cl. ...................................... 277/152; 277/205; 277/215
[58] Field of Search ................ 277/152, 205, 206 R, 277/206 A, 215

[56] References Cited

U.S. PATENT DOCUMENTS

| | | | |
|---|---|---|---|
| 2,196,337 | 4/1940 | Loweke | 277/215 X |
| 3,189,359 | 6/1965 | Haberkorn | 277/205 |
| 3,214,182 | 10/1965 | Herbruggen | 277/215 X |
| 3,271,038 | 9/1966 | Bastow | 277/205 |
| 3,318,202 | 5/1967 | Means | 277/205 X |
| 3,563,442 | 2/1971 | Kretchman | 277/208 |
| 3,627,335 | 12/1971 | Wheeler | 277/205 |
| 3,829,104 | 8/1974 | Green | 277/205 X |
| 3,920,254 | 11/1975 | Johnston et al. | 277/215 X |
| 4,345,771 | 8/1982 | Hasegawa et al. | 277/205 |
| 4,458,717 | 7/1984 | Boland | 277/215 X |
| 4,476,772 | 10/1984 | Gorman et al. | 277/205 X |
| 4,526,385 | 7/1985 | Wheeler | 277/205 X |
| 4,616,836 | 10/1986 | Drygalski et al. | 277/152 |
| 4,858,516 | 8/1989 | Klein | 277/205 X |
| 4,890,849 | 1/1990 | Eason | 277/206 R X |
| 4,900,042 | 2/1990 | Genda | 277/215 X |
| 4,921,258 | 5/1990 | Fournier et al. | 277/206 R X |

FOREIGN PATENT DOCUMENTS

| | | | |
|---|---|---|---|
| 557047 | 3/1960 | Belgium | 277/205 |
| 575906 | 5/1959 | Canada | 277/205 |
| 3130760 | 2/1983 | Fed. Rep. of Germany | 277/205 |
| 39359 | 4/1981 | Japan | 277/215 |
| 172063 | 7/1988 | Japan | 277/205 |
| 1019523 | 2/1966 | United Kingdom | 277/205 |

Primary Examiner—William A. Cuchlinski, Jr.
Assistant Examiner—Scott W. Cummings
Attorney, Agent, or Firm—Ralph E. Jocke

[57] ABSTRACT

A seal construction for a pneumatic valve (66) reduces resistance to movement of a stem (76) which directs flow through the valve. The seals (78) (108) are generally "v" shaped in cross section. The seals include heel portions (86) (110) which are supported on supporting surfaces (80) (112). The seals include first lip portions (92) (122) that extend from the heel portions to a surface that is moveable relative to the seal. Second lip portions (98) (128) extend from the heel portion to surfaces that are stationary relative to the seal. Spaces (104) (134) between radially extending projections (102) (132) and spaces (90) (120) between axially extending projections (88) (118) enable fluid entering pressure relief areas (106) (136) to escape to atmosphere. The seal construction avoids seal deformation that would otherwise increase resistance to stem movement.

9 Claims, 6 Drawing Sheets

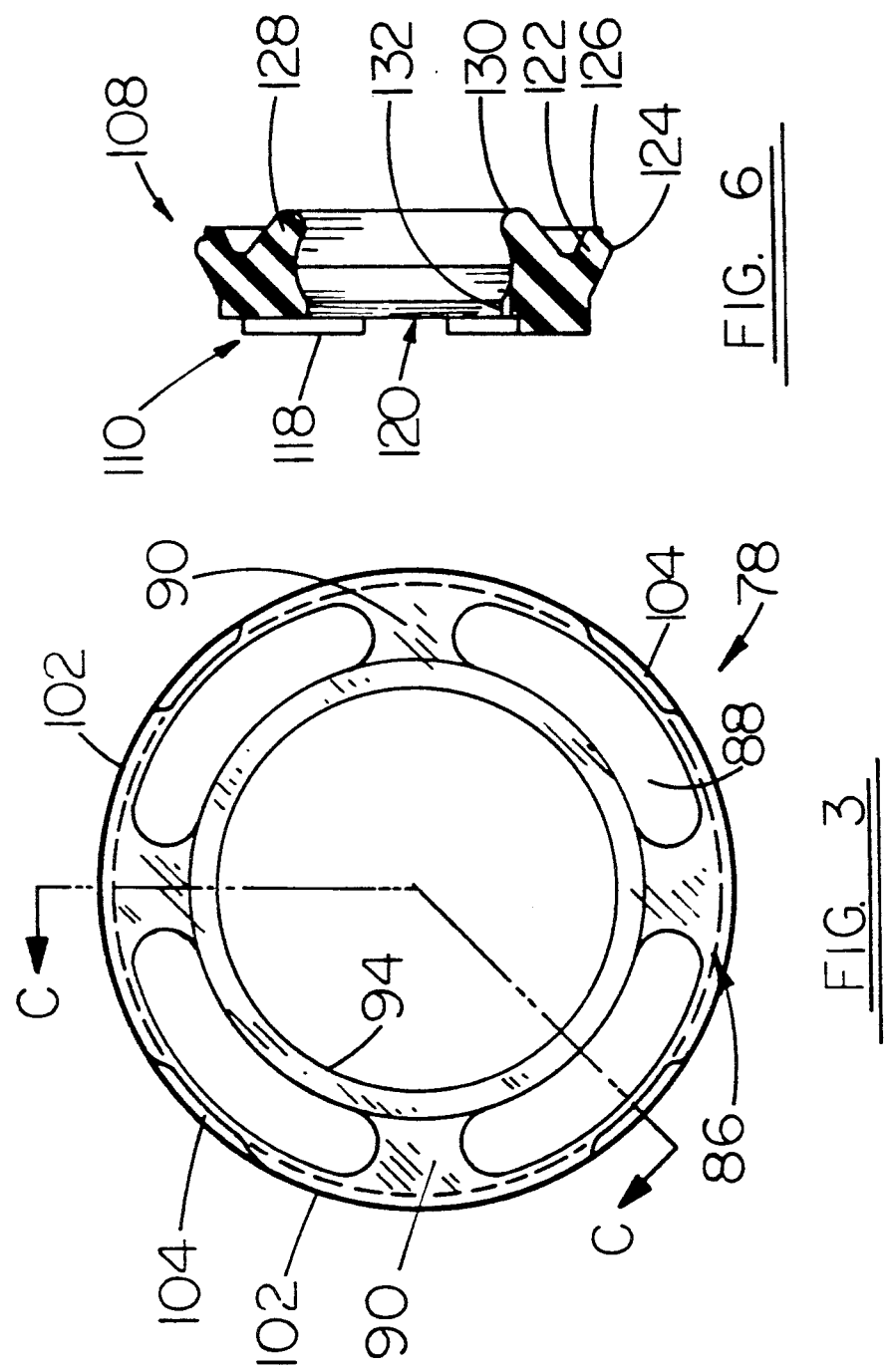

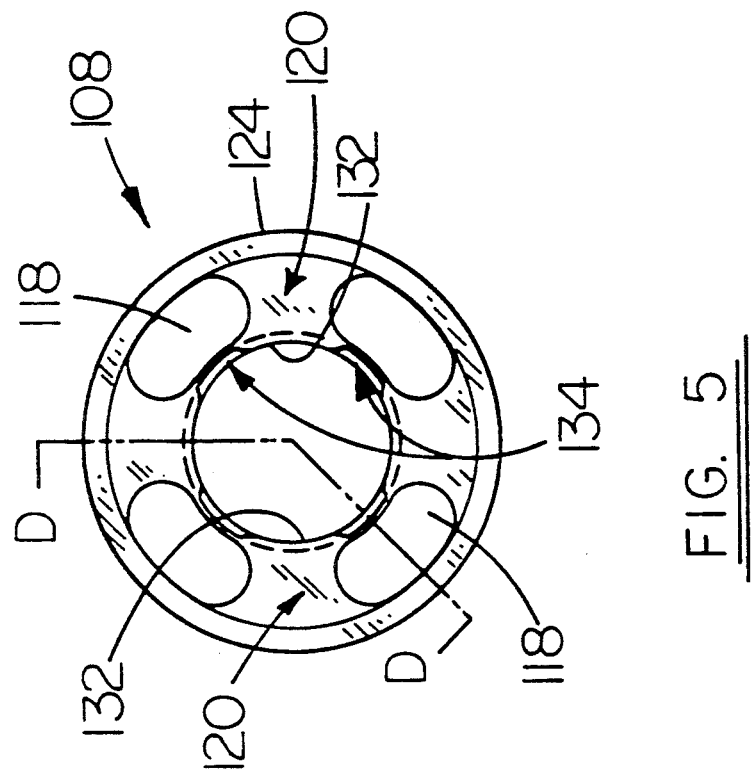
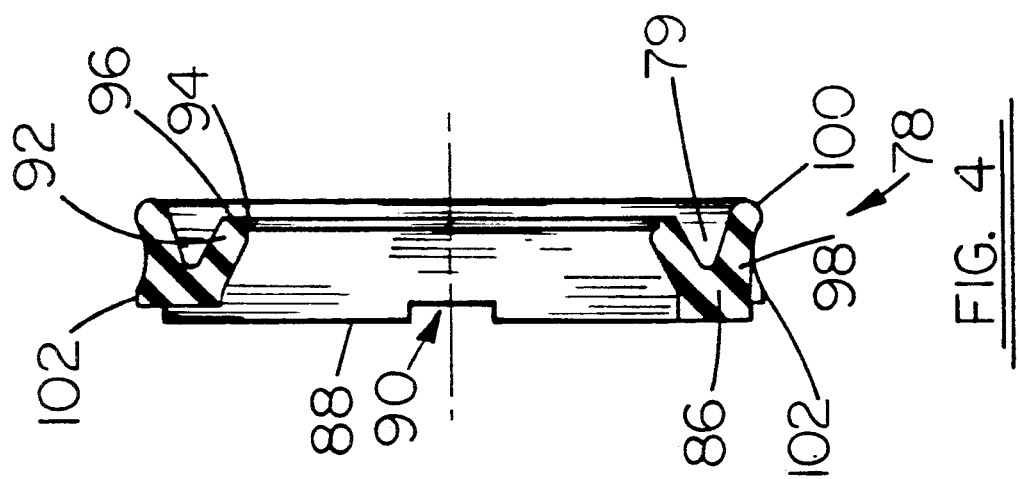

FLUID SEAL

TECHNICAL FIELD

This invention relates to fluid seals. Specifically, this invention relates to seals which are used to prevent the loss of fluid around a moveable stem in a pneumatic valve, as well as methods for reducing resistance to movement of a stem by adjacent seals.

BACKGROUND ART

Most types of fluid valves include a moveable stem or poppet that is used to move a fluid closure element. Such valves require one or more sealing elements to prevent fluid from leaking around the moveable stem.

FIG. 1 shows a typical pneumatic valve 10 of a type known in the prior art. Valve 10 has a body 12. The body houses an inlet chamber 16, as well as an outlet chamber 14 and an exhaust chamber 18. The inlet chamber 16 is connected to a supply of compressed air. The outlet chamber is connected to a fluid power device such as a pneumatic cylinder. The exhaust chamber is open to atmosphere.

A stem 20 extends through the inlet and outlet chambers. Stem 20 is moveable in the vertical direction as the valve is shown in FIG. 1. The stem includes an upper portion 22 which is in operative connection with means for moving the stem. In a typical application, an electrical solenoid is used for this purpose. The stem is biased upward in the body as shown in FIG. 1 by a spring 24 which contacts a lower portion 26 of the stem.

The stem has thereon a first enlargement 28 and second enlargement 30. The enlargements are comprised of resilient material. First enlargement 28 is positioned adjacent to a first seat 32. Second enlargement 30 is positioned adjacent a second seat 34. In a first position of the stem 20 shown in FIG. 1, first enlargement 28 abuts first seat 32. As a result, compressed air delivered to the inlet chamber 16 is prevented from passing into the outlet chamber 14. However, in the first position of the stem, the outlet chamber is open to the exhaust chamber 18 and the air delivered to the outlet chamber of the valve from a connected fluid power device flows therethrough to atmosphere.

When the stem 20 is moved upward from the position shown in FIG. 1, second enlargement 30 abuts second seat 34. As a result, air is prevented from flowing to the exhaust chamber. In the second position, first enlargement 28 is moved away from first seat 32 and the compressed air delivered to the inlet chamber of the valve passes through the outlet chamber to the connected device. By moving the spool between the first and second positions, fluid may be selectively delivered to or vented from the connected device.

To prevent the escape of fluid from inside the valve around the moveable stem 20, a first seal 36 and a second seal 38 are used. First seal 36 is generally "v" shaped in cross section. It has a heel portion 40 which abuts a supporting surface 42. The supporting surface extends radially outward from the stem. Seal 36 has a first lip portion 44 that extends outward from the heel portion 40. First lip portion 44 contacts a stationary wall 46 inside the body of the valve. First seal 36 also has a second lip portion 48 which extends from the heel portion and contacts a wall 50 of the stem.

As shown in FIG. 1, the open portion of the "v" shaped first seal 36 is directed toward the interior of the valve. As a result, fluid pressure in the valve forces the lip portions against the adjacent surfaces. This enhances sealing action.

Fluid pressure from the interior of the valve may leak past second lip portion 48 into an area 52. Area 52 is bounded by the stem wall 50, the supporting surface 42, the heel portion 40 and the second lip portion 48 of the seal. The fluid pressure which enters area 52 is trapped therein. As a result, the fluid pressure tends to push the heel of seal 36 radially outward in the direction of arrow A in FIG. 1. When the heel portion 40 of the seal is deformed outward, more of lip portion 44 is pushed into contact with the wall, increasing friction and resisting movement of the stem by the solenoid or other movement means.

A similar phenomenon occurs at second seal 38. Seal 38 has a heel portion 54 which abuts a supporting surface 55 of the body. A first lip portion 56 extends from heel portion to a moveable wall 58 on the lower stem. A second lip portion 60 extends from heel portion 54 to a stationary wall 62 inside the body. Fluid pressure may leak past the second lip portion 60 into an area 64. Area 64 is bounded by the stationary wall 62, the second lip portion 60, the supporting surface 55 and the heel portion 54. When fluid pressure is trapped in area 64, the heel portion of seal 38 moves in the direction of arrow B. As a result, first lip portion 56 is pushed towards wall 58 of the stem as the seal is deformed. The combined effects of additional contact area, as well as lateral pressure, resist movement of the stem.

The combined effects of fluid leakage into areas 52 and 64 significantly increase the force that a solenoid or other movement means must supply to move the stem between the first and second positions of the valve. In addition, the added force can cause premature wearing of the seals in the areas of the valve in contact with them. This phenomenon afflicts not only pneumatic valves, but other types of fluid valves as well. Thus, there exists a need for a seal and a method that reduces the amount of force that is required to move the stem of a valve and that reduces premature wearing of the seals.

DISCLOSURE OF INVENTION

It is an object of the present invention to provide a fluid seal that lowers resistance to movement of an adjacent valve stem.

It is a further object of the present invention to provide a seal that reduces seal and component wear.

It is a further object of the present invention to provide a method for reducing the resistance applied by an adjacent seal to a moveable stem or adjacent body surface.

Further objects of the present invention will be made apparent in the following Best Modes for Carrying Out Invention and the appended claims.

The foregoing objects are accomplished in the preferred embodiment by a fluid seal which is used for sealing between two generally parallel surfaces. The parallel surfaces are longitudinally moveable with respect to one another. The seal is used to separate an area of high fluid pressure from an area of relatively low fluid pressure.

In a first preferred embodiment of the seal of the present invention, the seal is generally "v" shaped in cross section and has a heel portion. The heel portion is supported by a supporting surface which extends perpendicular to the parallel surfaces. The supporting surface is fixed relative to a first of the parallel surfaces.

The seal further includes a first lip portion that extends from the heel portion to the surface that is moveable relative to the seal.

The seal also has a second lip portion that extends from the heel portion to the surface that is fixed relative to the seal.

The second lip portion contacts the relatively stationary surface at a contact point. The contact point, second lip portion, heel portion, supporting surface and stationary surface bound a pressure relief area. The heel portion of the seal includes axially extending projections. Spaces between the axially extending projections provide fluid passages through which fluid may flow from the pressure relief area to an area of lower pressure. As a result, any fluid pressure which leaks past the second lip portion escapes and applies no lateral force to deform the seal.

The second lip portion of the seal adjacent to the heel also includes spaced projections that extend radially outward to the stationary surface. Fluid in the pressure relief area is enabled to flow between the radially extending projections. The radially extending projections also serve to support the seal and hold it in position relative to the stationary surface.

BRIEF DESCRIPTION OF DRAWINGS

FIG. 3 is a bottom view of a stationary seal used in the valve shown in FIG. 2.

FIG. 4 is a cross sectional view of the stationary seal taken along line "c—c" in FIG. 3.

FIG. 5 is a bottom view of a moveable seal of the valve shown in FIG. 2.

FIG. 6 is a cross sectional view of the moveable seal shown in FIG. 5 taken along line "d—d" in FIG. 5.

BEST MODES FOR CARRYING OUT INVENTION

Figure 2:
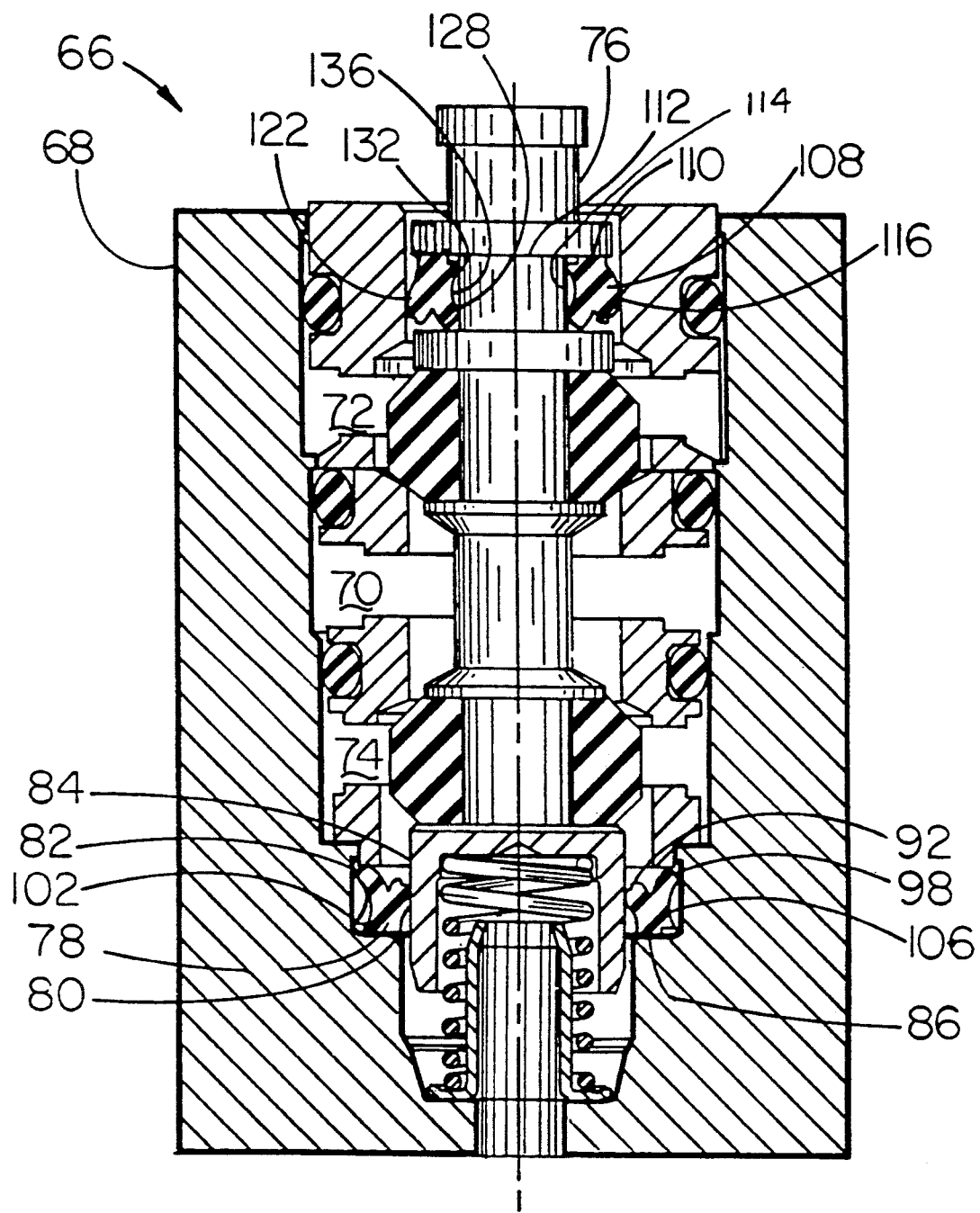
FIG. 2 is a cross sectional view of a pneumatic valve incorporating the preferred embodiment of a fluid seal of the present invention.

Referring now to the drawings and particularly to FIG. 2, there is shown therein a pneumatic valve 66 which incorporates a first embodiment of the low resistance fluid seal construction of the present invention. The valve has a body 68 which encloses an inlet chamber 72, outlet chamber 70 and an exhaust chamber 74. The valve has a stem 76 which is moveable inside the valve in the vertical direction as the valve is shown in FIG. 2. This stem is moveable by a solenoid or other movement means (not shown) like the prior art valve previously described. The stem also includes enlargements like those found on the conventional valve previously described, which are used to alternatively deliver compressed air from the inlet chamber to the outlet chamber, or connect the outlet chamber to atmosphere.

A first seal 78 of the present invention, is mounted adjacent to the stem in a lower portion of the valve as shown in FIG. 2. Seal 78 is positioned on a supporting surface 80 inside the body of the valve. Seal 78 on a first side contacts a stationary wall 82 of the body, and on a second side contacts a moveable wall 84 of the stem.

As shown in detail in FIGS. 3 and 4, first seal 78, when it is undeformed in cross section, has a heel portion 86 that abuts supporting surface 80 of the valve. Heel portion 86 includes axially extending projections 88. As shown in FIG. 3, in the preferred embodiment four axially extending projections 88 extend from the heel portion of the seal. Spaces 90 extend between the axially spaced projections.

As shown in FIG. 4, first seal 78 is generally "v" shaped in cross section and includes a recess 79 in its central area. A first lip portion 92 extends radially inward from the heel portion 86. First lip portion 92 contacts the moveable outside wall 84 of the stem at a rounded surface 94. First lip portion 92 terminates at a blunt first outward end 96.

Seal 78 also includes a second lip portion 98 which extends from the heel portion 86 and contacts stationary wall 82 of the valve at a second rounded face 100 (see FIG. 4). Second lip portion 98, in the area adjacent the heel portion, includes radially extending projections 102. As shown in FIG. 3, in the preferred embodiment, there are four radially extending projections which extend around semi-circular segments of the seal. Spaces 104 are positioned between the radially extending projections 102. The projections 102 extend outward and abut stationary wall 82 of the valve as shown in FIG. 2. In the preferred form of the invention, seal 78 is made from 80 Durometer Buna-N rubber material.

An operation of the pneumatic valve 66, first seal 78 prevents the escape of compressed air around the stem. As shown in FIG. 2, the first lip portion 92 is in contact with the surface 84 of the moveable stem, and second lip portion 98 is in contact with the stationary wall 82. The radially extending projections 102 also abut stationary wall 82. The heel portion 86 of seal 78 is disposed away from the surface of the stem.

Second lip portion 98, from the point at which it contacts stationary wall 82, bounds a pressure relief area 106. Any fluid pressure which leaks past second lip portion 98 and enters the pressure relief area, is free to pass through the spaces 104 between the radially extending projections 102. Likewise, fluid in the pressure relief area may travel through the spaces 90 which extend between the axially extending projections 88 in the heel portion of the seal. The pressure relief area 106 is open to the area of the stem beyond the point at which the first lip portion 92 is in contact with the stem. As a result, the pressure relief area 106 is maintained at atmospheric pressure.

As the pressure relief area is always at atmospheric pressure, any small amounts of fluid which may pass the second lip portion escape without deforming the seal. This avoids trapped fluid pushing the heel portion of the seal against the stem as occurs in the prior art seals. The stem of the valve of the present invention is thereby enabled to move easier. In addition, the radially extending projections 102 maintain the seal properly positioned so it cannot be rotated or twisted by fluid pressure or frictional forces applied by the moveable stem acting on the first lip portion 92.

Referring again to FIG. 2, a second seal 108 is mounted on the stem 76 in an upper portion of the valve. Second seal 108 like seal 78, incorporates the principles of the present invention and provides reduced resistance to stem movement.

Seal 108 is generally "v" shaped in cross section and includes a heel portion 110 that abuts a supporting surface 112 on the stem of the valve and which is moveable therewith. Seal 108 extends between a stem surface 114 that is stationary relative to the seal and a wall surface 116 of the body that is stationary but is moveable relative to seal 108 which moves with the stem.

As shown in FIGS. 5 and 6, seal 108 has a profile that is similar, but reversed, from that of seal 78. Heel portion 110 includes axially extending projections 118 that abut supporting surface 112. Axially extending projections 118 have spaces 120 extending between them.

Seal 108 also has a first lip portion 122 that extends radially outward from the heel portion 110. First lip portion 122 has a first rounded face 124 that contacts wall 116 inside the body of the valve as shown in FIG. 2. First lip portion 122 terminates in a blunt first outward end 126.

Seal 108 also has a second lip portion 128 which extends radially inward from the heel portion 110. Second lip portion 128 terminates in a second rounded face 130. Second rounded face 130 contacts stem surface 114 as shown in FIG. 2.

Second lip portion 128, in the area adjacent the heel portion of the seal, includes inward radially extending projections 132. Spaces 134 extend between the radially extending projections 132. The radially extending projections also abut stem wall 114 as shown in FIG. 2. Seal 108, like seal 78, is preferably made from 80 Durometer Buna-N rubber material.

In operation of the valve, first lip portion 122 contacts wall 116 of the valve to prevent fluid pressure in the valve from escaping to atmosphere. Radially extending projections 132 abut stem wall 14 to help maintain the seal in proper orientation on the stem.

Second lip portion 128 contacts stem wall 144 and bounds a pressure relief area 136. Fluid pressure which leaks past the second lip portion into the pressure relief area exhausts to atmosphere through the spaces between the radially extending projections and the axially extending projections on the seal. Because pressure in the pressure relief area 136 is relieved, the seal does not deform and the heel portion of the seal is maintained away from the stationary wall of the valve. The stem is thereby able to move between the first and second positions more freely.

Figure 1:
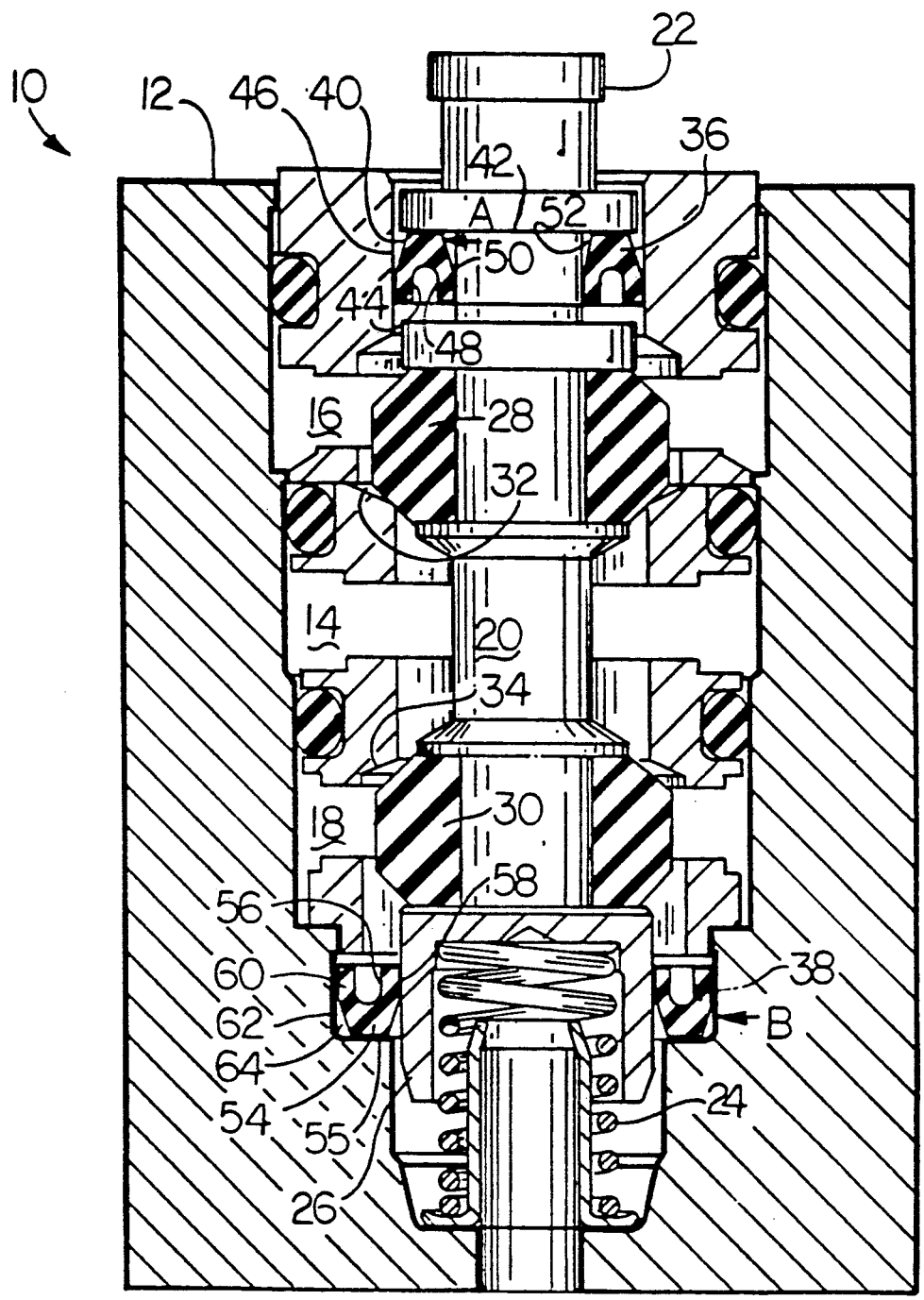
FIG. 1 is a cross sectional view of a prior art pneumatic valve and seal construction of a type previously described.
Figure 7:
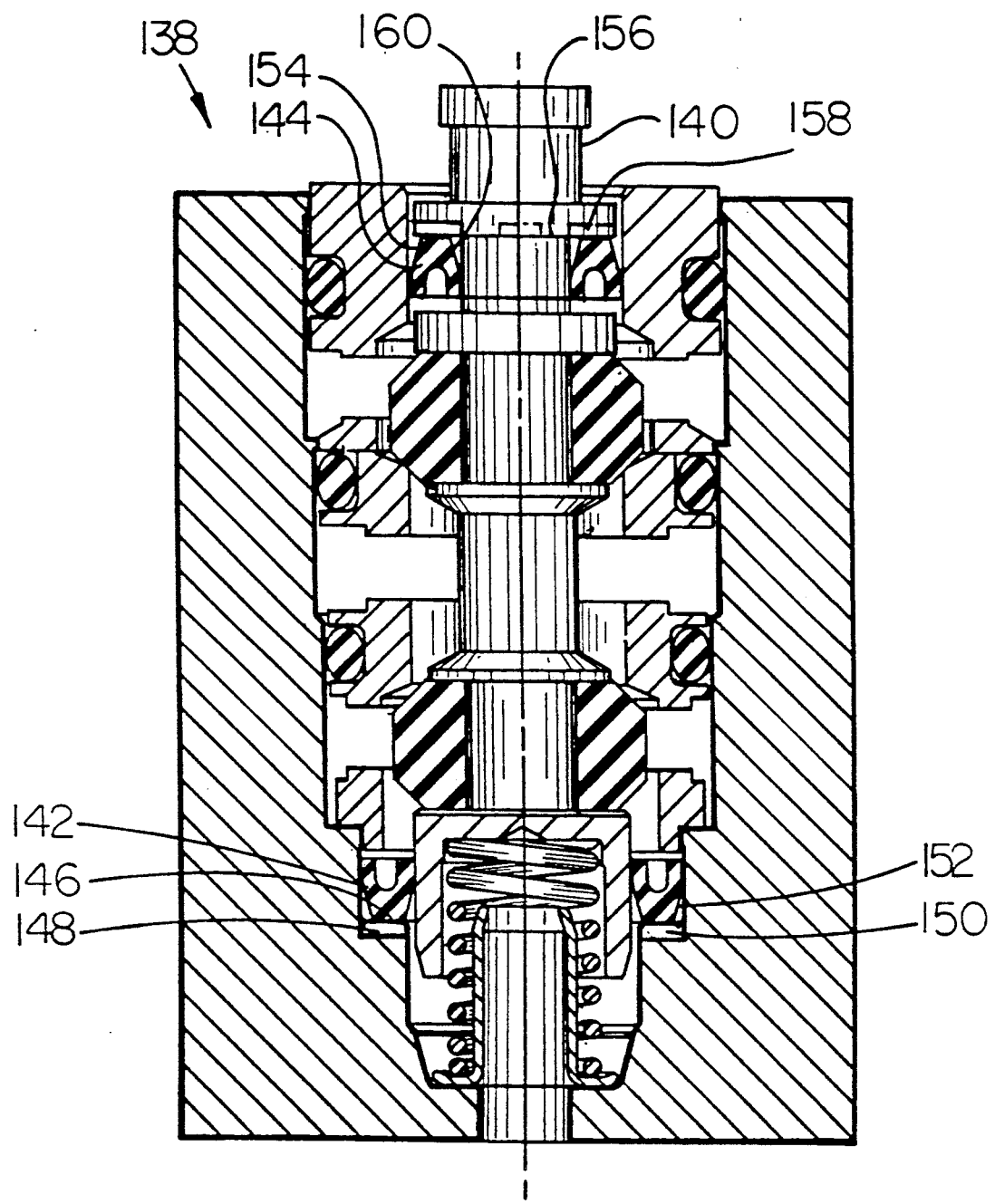
FIG. 7 is an alternative embodiment of the present invention which incorporates conventional seals.

Although the first embodiment of the invention is a seal that includes a fluid passage means for relieving pressure that would otherwise deform the seal and resist movement of the adjacent stem, the invention may also be applied to valves that use conventional "v" shaped, o-ring or other varieties of seals. An alternative embodiment of a valve 138 is shown in FIG. 7. This valve includes an alternative embodiment of the invention and is similar to the valve shown in FIG. 1 except as detailed hereafter.

Valve 138 has a stem 140 which is sealed using a first seal 142 and a second seal 144, both of which are of conventional construction. First seal 142 has a heel portion 146. Heel portion 146 is supported on a supporting surface 148. Supporting surface 148 has four radially extending slots 150 which extend under the heel portion of the seal.

Any fluid pressure which passes the outboard lip of seal 142 enters a pressure relief area 152. Any pressure in the pressure relief area exhausts through slots 150 to atmosphere. As a result, the heel portion of seal 142 maintains its position away from the stem. The seal is not deformed as in the prior art and resistance to stem movement is reduced.

Figure 8:
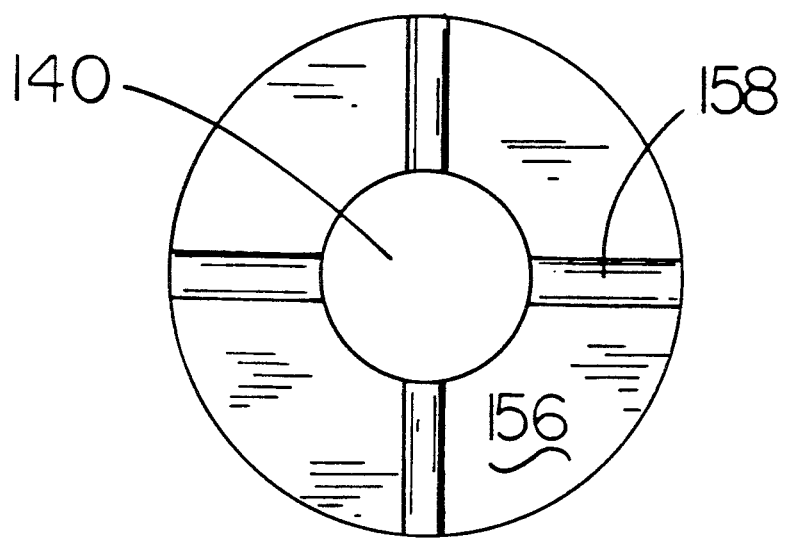
FIG. 8 is a plan view of a supporting surface of the stem of the pneumatic valve shown in FIG. 7.

Second seal 144 has a heel portion 154 which abuts a supporting surface 156 on the stem. As better shown in FIG. 8, supporting surface 15 of the stem has four radially extending slots 158 cut therein. Slots 158 extend below the heel portion of seal 144.

Slots 158 serve to relieve fluid pressure in a pressure relief area 160 which is bounded by the inboard lip of seal 144. As a result, fluid pressure which enters the pressure relief area is free to exhaust and does not deform the seal. The heel portion of the seal remains disposed away from the stationary wall of the valve body and lowers the resistance to movement of the stem.

The present invention enables the production of fluid valves that include movement means that require less force to move the stem. This may result in valves that are more compact and less expensive. Although the preferred form of the invention is used in conjunction with pneumatic valves which control the flow of compressed air, the invention may also be used in valves which control the flow of other gases or liquids. The invention could also be used in devices other than valves, in which seals are used between stationary and moveable surfaces.

Thus, the present invention achieves the above stated objectives, eliminates difficulties encountered in the use of prior devices and methods, solves problems and obtains the desirable results described herein.

In the foregoing description, certain terms have been used for brevity, clarity and understanding, however, no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries and principles of the invention, the manner in which it is utilized, and the advantages and useful results obtained, the new and useful structures, devices, elements, arrangements, parts, combinations, systems, equipment, operations, methods and relationships are set forth in the appended claims.

We claim:

1. A seal for preventing the flow of fluid betwen a first surface and a second surface, said surfaces generally parallel and said second surface moveable relative to said first surface, said seal being generally ring shaped and generally "V" shaped in cross section, said seal separating a first area of high fluid pressure from a second ara at a lower pressure, said seal supporting on a supporting surface extending traverse of said first and second surfaces;

said seal having a resilient body comprising in cross section:

a heel portion, said heel portion including a plurality of spaced arcuate axially extending projections, said projections having heel spaces thereinbetween, said axially extending projections abutting said supporting surface, said axially extending projections disposed away froms aid first surface and said second surface, a first lip portion extending outward of said heel portion and toward said second surface, said first lip portion terminating at a first outward end, said first lip portion engaging said second surface at a first contact point adjacent said first outward end;

a second lip portion extending outward of said heel portion and toward said first surface, said second lip portion terminating at a second outward end, said second lip portion engaging said first surface at a second contact point adjacent said second outward end, said second lip portion including said plurality of evenly spaced radially extending projections adjacent said heel portion, said radially extending projectiosn having side spaces thereinbetween, said radially extending projections in abutting contact with said first surface, said radially extending projections being centered with respect to said heel spaces;

whereby a pressure relief area bounded by said second lip portion, first surface and said second contact point is open to said second area through said side spaces and said heel spaces, and whereby said heel portion is maintained disposed of said second surface reducing frictional resistance to movement of said second surface.

2. The seal according to claim 1 wherein said radially extending projections are tapered toward said first surface in a direction from said second contact point to said heel portion, said radially extending projections engaging said first surface adjacent said heel portion at a third contact point axially disposed of said supporting surface in an opposed direction, said axially extending projections radially disposed of said first surface.

3. The seal according to claim 2 wherein said first lip portion includes a rounded surface in cross section and said first contact point is on said rounded surface.

4. The seal according to claim 3 wherein said supporting surface is fixed relative of said first surface, said supporting surface and first surface boundign a recess groove in a rigid body, and wherein said first contact point of said first lip portion is axially disposed from said supporting surface in said opposed direction a first distance and said second contact point of said second lip portion is axially disposed from said supporting surface in said opposed direction a second distance, said second distance being greater than said first distance.

5. The seal according to claim 4 wherein the fluid is air pressure and the first surface is a stationary surface and the second surface is an outer surface of a stem.

6. A seal for preventing the flow of fluid between a stationary surface and a moveable surface, generally parallel and moveable relative thereto, said seal being generally ring shaped and generally "V" shaped in cross section, said seal seaparating a first area of high fluid pressure form a second area at a lower pressure, said seal supported on a supporting surface extending traverse of said stationary and mvoeable surfaces, said supporting surface fixed relative to said stationary surface, said supporting surface and first surface bounding a recess groove in a rigid body, said seal having a resilient body comprising in cross section: a heel portion, said heel portion abutting said supporting surface and radially disposed toward said stationary surface from said moveable surface, said heel portion including a plurality of arcuate spaced axially extending projections, said axially extending projections defining heel spaces extending between said axially extending projections;

said body further including a plurality of spaced, radially extending projections engaging said stationary surface, said radially extending projections defining side spaces extending between said radially extending projections, said side spaces axially centered with respect to said axially extending projections;

a first lip portion extending outward of said heel portion and toward said movable surface, said first lip portion terminating at a first outward end, said first lip portion engaging said moveable surface at a first contact point adjacent said first outward end, said first outward end and said first contact point being disposed axially from said supporting surface a first distance;

a second lip portion extending outward of said heel portion and toward said stationary surface, said second lip portion termianting at a second outward end, said second lip portion engaging said stationary surface at a second contact point adjacent said second outward end, a pressure relief area bounded by said second lip portion, stationary surface and said second contact point, said second contact point axially disposed of said supporting surface a second distance, said second distance greater than said first distance; and wherein fluid passes from said pressure relief area to said second area through said side spaces and said heel spaces.

7. The seal according to claim 6 wherein said first lip portion includes a rounded surface in cross section and said first contact point is on said rounded surface.

8. The seal according to calim 7 wherein said radially extending projections are outwardly tapered from said seal body, said taper extending toward said stationary sruface and in a first axial direction from said second contact point to said supporting surface, said radially extending projections engaging said stationary surface at third contact points, said third contact points disposed from said supporting surface in a direction opposed of said first direction.

9. The seal according to claim 8 wherein said seal has four axially extending projections and four radially extending projections.

* * * * *

UNITED STATES PATENT AND TRADEMARK OFFICE
CERTIFICATE OF CORRECTION

PATENT NO. : 5,127,661
DATED : July 7, 1992
INVENTOR(S) : David C. Franson, Mark A. Kavanaugh and Wallace K. Snead It is certified that error appears in the above—identified patent and that said Letters Patent is hereby corrected as shown below:

Column 6, Line 51, Claim 1, "ara" should be "area".
Column 6, Line 61, Claim 1, "froms aid" should be "from said".
Column 7, Line 9, Claim 1, "projectiosn" should be "projections".
Column 7, Line 36, Claim 4, "boundign" should be "bounding".
Column 7, Line 52, Claim 6, "seaparating" should be "separating".
Column 7, Line 53, Claim 6, "form" should be "from".
Column 7, Line 55, Claim 6, "mvoeable" should be "moveable".
Column 8, Line 29, Claim 6, "termianting" should be "terminating".
Column 8, Line 44, Claim 8, "calim" should be "claim".
Column 8, Line 47, Claim 8, "sruface" should be "surface".

Signed and Sealed this

Seventh Day of September, 1993

Attest:

BRUCE LEHMAN

Attesting Officer

Commissioner of Patents and Trademarks